(12) United States Patent
Kim et al.

(10) Patent No.: US 10,176,060 B2
(45) Date of Patent: Jan. 8, 2019

(54) MEMORY APPARATUS FOR APPLYING FAULT REPAIR BASED ON PHYSICAL REGION AND VIRTUAL REGION AND CONTROL METHOD THEREOF

(71) Applicant: Korea University Research and Business Foundation, Seoul (KR)

(72) Inventors: Seon Wook Kim, Gyeonggi-do (KR); Ho Kwon Kim, Gyeonggi-do (KR); Jae Yung Jun, Seoul (KR); Kyu Hyun Choi, Seoul (KR)

(73) Assignee: Korea University Research and Business Foundation, Seoul (KR)

( * ) Notice: Subject to any disclaimer, the term of this patent is extended or adjusted under 35 U.S.C. 154(b) by 171 days.

(21) Appl. No.: 15/419,300

(22) Filed: Jan. 30, 2017

(65) Prior Publication Data

US 2017/0371753 A1  Dec. 28, 2017

(30) Foreign Application Priority Data

Jun. 28, 2016  (KR) .................... 10-2016-0080869

(51) Int. Cl.
*G06F 11/00* (2006.01)
*G06F 11/16* (2006.01)
*G06F 11/07* (2006.01)
*G06F 11/30* (2006.01)

(52) U.S. Cl.
CPC .......... *G06F 11/167* (2013.01); *G06F 11/073* (2013.01); *G06F 11/3037* (2013.01)

(58) Field of Classification Search
CPC .. G06F 11/073; G06F 11/1064; G06F 11/167; G06F 12/0292; G06F 12/06; G06F 12/10–12/1036
See application file for complete search history.

(56) References Cited

U.S. PATENT DOCUMENTS

| | | | | |
|---|---|---|---|---|
| 5,666,482 A | * | 9/1997 | McClure | G06F 12/126 711/129 |
| 2009/0044086 A1 | * | 2/2009 | Craske | G06F 11/1064 714/799 |
| 2016/0034344 A1 | * | 2/2016 | Hoekstra | G06F 11/1064 714/764 |

\* cited by examiner

*Primary Examiner* — Michael Maskulinski
(74) *Attorney, Agent, or Firm* — Fox Rothschild LLP

(57) ABSTRACT

Provided are a memory apparatus for applying fault repair based on a physical region and a virtual region and a control method thereof. That is, the fault repair is applied based on the physical region and the virtual region which use an information storage table of a virtual basic region using a hash function, thereby improving efficiency of the fault repair.

22 Claims, 10 Drawing Sheets

UNIT REGION

|   | 0 | 1 | 2 | 3 |
|---|---|---|---|---|
| 0 |   | X | X | X |
| 1 |   |   |   |   |
| 2 |   |   |   |   |
| 3 |   |   |   |   |

UNIT REGION

X : FAULT

FIG. 3

MEMORY APPARATUS FOR APPLYING FAULT REPAIR BASED ON PHYSICAL REGION AND VIRTUAL REGION AND CONTROL METHOD THEREOF

CROSS-REFERENCE TO RELATED APPLICATION

This application claims the benefit of Korean Application No. 10-2016-0080869 filed on Jun. 28, 2016 with the Korean Intellectual Property Office, the disclosure of which is incorporated herein by reference.

BACKGROUND

1. Field of the Invention

The present document relates to a memory apparatus applying fault repair based on a physical region and a virtual region and a control method thereof, and more particularly, to a memory apparatus applying fault repair based on a physical region and a virtual region which use an information storage table of a virtual region using a hash function.

2. Description of the Related Art

In a memory system configured by a plurality of subarrays, fault repair may be performed using one or more of spare rows and spare columns in the unit of sub arrays.

In this system, when a lot of fault is generated in the specific sub array, a storage space in which information on the fault position is to be stored is insufficient so that it may be difficult to repair the fault with the structure of the related art in which spare cell mapping information is stored.

SUMMARY

The present solution has been made in an effort to memory apparatus and a control method thereof which, in the information storage table configured by a plurality of unit regions, map the unit regions which hash the information storage location to physical basic regions and divide each of the mapped physical basic regions into a plurality of physical sub regions having same size. Then, a combination of virtual basic regions which satisfies a predetermined target value is checked among all configurable combinations, the position information related with the checked combination of the virtual basic regions which satisfies the target value is stored, and information (or data) corresponding to the position information related with the combination of the virtual basic regions which satisfies the stored target value is stored in the information storage table.

The present solution has been made in an effort to further provide a memory apparatus applying fault repair based on a physical region and a virtual region using an information storage table of virtual basic regions using a hash function and a control method thereof.

According to an aspect of the present solution, there is provided a control method of a memory apparatus applying fault repair based on a physical region and a virtual region. The control method includes: receiving a memory request transmitted from a device, by means of a data input/output unit; converting a physical basic region address into a virtual basic region address based on input address included in the memory request and a position information of the virtual region stored in a predetermined storage region set in a storage medium, by means of an address converter, by means of an address converter; checking spare cell information which replaces a fault address in a fault address storage space of the storage medium based on the converted virtual basic region address, a plurality of column addresses or row addresses set in advance in the storage medium, and the input address, by means of an information providing unit; selecting a final address based on the checked spare cell information which replaces the fault address, the plurality of column addresses or row addresses set in advance in the storage medium, and the input address, by means of the information providing unit; providing position information of data corresponding to the selected final address, by means of an address decoder; and performing any one of a read command function and a write command function included in the data request, based on the position information of the data corresponding to the final address and the data request, by means of a memory cell.

In some scenarios, the memory request may include at least one of an input address, a command, and write data.

In those or other scenarios, the position information of the virtual region may include position information of K bits and position information of M+N−K bits related with the virtual region, the virtual region being configured by combining the physical region, M, N and K being natural numbers and K being equal to or smaller than M+N.

In those or other scenarios, the spare cell information which replaces the fault address may be any one of information on a spare column which replaces the fault address and information on a spare row which replaces the fault address.

In those or other scenarios, in the checking of space cell information which replaces the fault address, the input address is replaced to an address of the spare cell from the fault address to approach the address of a spare cell which is not an address in which the fault is generated to repair a fault.

In those or other scenarios, in the checking of space cell information which replaces the fault address, in the case of fault repair using a spare row, the fault address may be replaced by an address of a spare row which belongs to a physical address region, and in the case of fault repair using a spare column, the fault address may be replaced by an address of a spare column which belongs to a virtual address region.

In those or other scenarios, the selecting of a final address includes any one of: selecting, when the input address is any one of the plurality of predetermined column addresses and row addresses, a value obtained by replacing the fault address by an address of a spare cell as the final address, by means of the information providing unit; and selecting, when the input address is not the fault address, the input address as the final address, by means of the information providing unit.

In those or other scenarios, the providing of position information of data corresponding to the final address may include any one of providing, when the final address is a value obtained by replacing the fault address by an address of a spare cell, position information of data corresponding to an address of the spare cell; and providing, when the final address is the input address, position information of data corresponding to the input address.

In those or other scenarios, in the performing of any one of a read command function and a write command function included in the data request, when the read command is included in the data request, data to be output to the outside related with the position information of data corresponding to the final address may be read from a position corresponding to position information of the data in the memory cell.

In those or other scenarios, in the performing of any one of a read command function and a write command function included in the data request, when the write command is included in the data request, the write data may be stored in the memory cell based on position information of write data included in the memory request and data corresponding to the final address.

In those or other scenarios, the control method may further include: temporarily storing, when a read command is included in the memory request, data corresponding to the input address output from the memory cell, by means of the data input/output unit; and providing data corresponding to the temporarily stored input address to the device which requests the data, by means of the data input/output unit.

In some scenarios, there is provided a memory apparatus applying fault repair based on a physical region and a virtual region. The memory apparatus includes: a data input/output unit which receives a memory request transmitted from a device; an address converter which converts a physical basic region address into a virtual basic region address based on input address included in the memory request and a position information of the virtual region stored in a predetermined storage region set in a storage medium; an information providing unit which checks spare cell information which replaces a fault address in a fault address storage space of the storage medium based on the converted virtual basic region address, a plurality of column addresses or row addresses set in advance in the storage medium, and the input address and selects a final address based on the checked spare cell information which replaces the fault address, the plurality of column addresses or row addresses set in advance in the storage medium, and the input address; an address decoder which provides position information of data corresponding to the selected final address; and a memory cell which performs any one of a read command function and a write command function included in the data request, based on the position information of the data corresponding to the final address and the data request, by means of a memory cell.

In those or other scenarios, the memory request may include at least one of an input address, a command and write data.

In those or other scenarios, the position information of the virtual region includes position information of K bits and position information of M+N−K bits related with the virtual region, the virtual region being configured by combining the physical region, M, N and K being natural numbers and k being equal to or smaller than M+N.

In those or other scenarios, the spare cell information which replaces the fault address may be any one of information on a spare column which replaces the fault address and information on a spare row which replaces the fault address.

In those or other scenarios, when the input address is any one of the plurality of predetermined column addresses and row addresses, the information providing unit may select a value obtained by replacing the fault address by an address of a spare cell as the final address.

In those or other scenarios, when the input address is not equal to the fault address, the information providing unit may select the input address as the final address.

In those or other scenarios, when the final address is a value obtained by replacing the fault address by an address of the spare cell, the address decoder may provide position information of data corresponding to the address of the spare cell to the memory cell.

In those or other scenarios, when the final address is the input address, the address decoder may provide position information of data corresponding to the input address to the memory cell.

In those or other scenarios, when the read command is included in the data request, the memory cell may read data to be output to the outside related with the position information of data corresponding to the final address from a position corresponding to position information of the data in the memory cell.

In those or other scenarios, when the write command is included in the data request, the memory cell may store the write data in the memory cell based on position information of write data included in the memory request and data corresponding to the final address.

In those or other scenarios, when a read command is included in the memory request, the data input/output unit may temporarily store data corresponding to the input address output from the memory cell and provide data corresponding to the temporarily stored input address to the device which requests the data.

In some scenarios, the system which maps unit regions which hash an information storage location in an information storage table configured by a plurality of unit regions to physical basic regions, checks a combination of a virtual basic region which satisfies a predetermined target value among all configurable combinations while dividing the mapped physical basic regions into a plurality of physical sub regions having same size, stores position information related with the combination of the virtual basic regions which satisfies the checked target value, and stores information (or data) corresponding to position information related with the combination of the virtual basic regions which satisfies the stored target value in the information storage table, thereby improving a performance of the entire system by equally using the entire information storage space in every region and maximizing efficiency of the information storage space by utilizing the information storage space.

Further, according to the present solution, the fault repair is applied based on the physical regions and the virtual regions which use an information storage table of virtual basic regions using a hash function, thereby improving efficiency of the fault repair.

BRIEF DESCRIPTION OF DRAWINGS

FIGS. 3, 4 and 5 are views illustrating an example of configuring the most optimal cache memory when 4-way set-associative cache is implemented using 4×4 memory blocks including a fault block.

DETAILED DESCRIPTION

Figure 1:
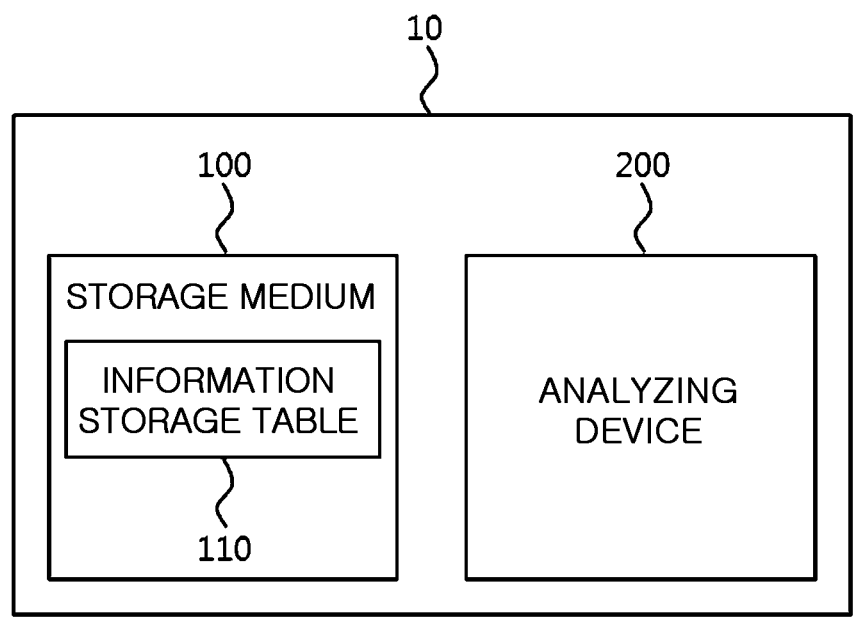
FIG. 1 is a block diagram illustrating an information storage table configured by a plurality of unit regions and an entire analyzing system configured by an analyzing device which finds out optimal information storage.
Figure 2:
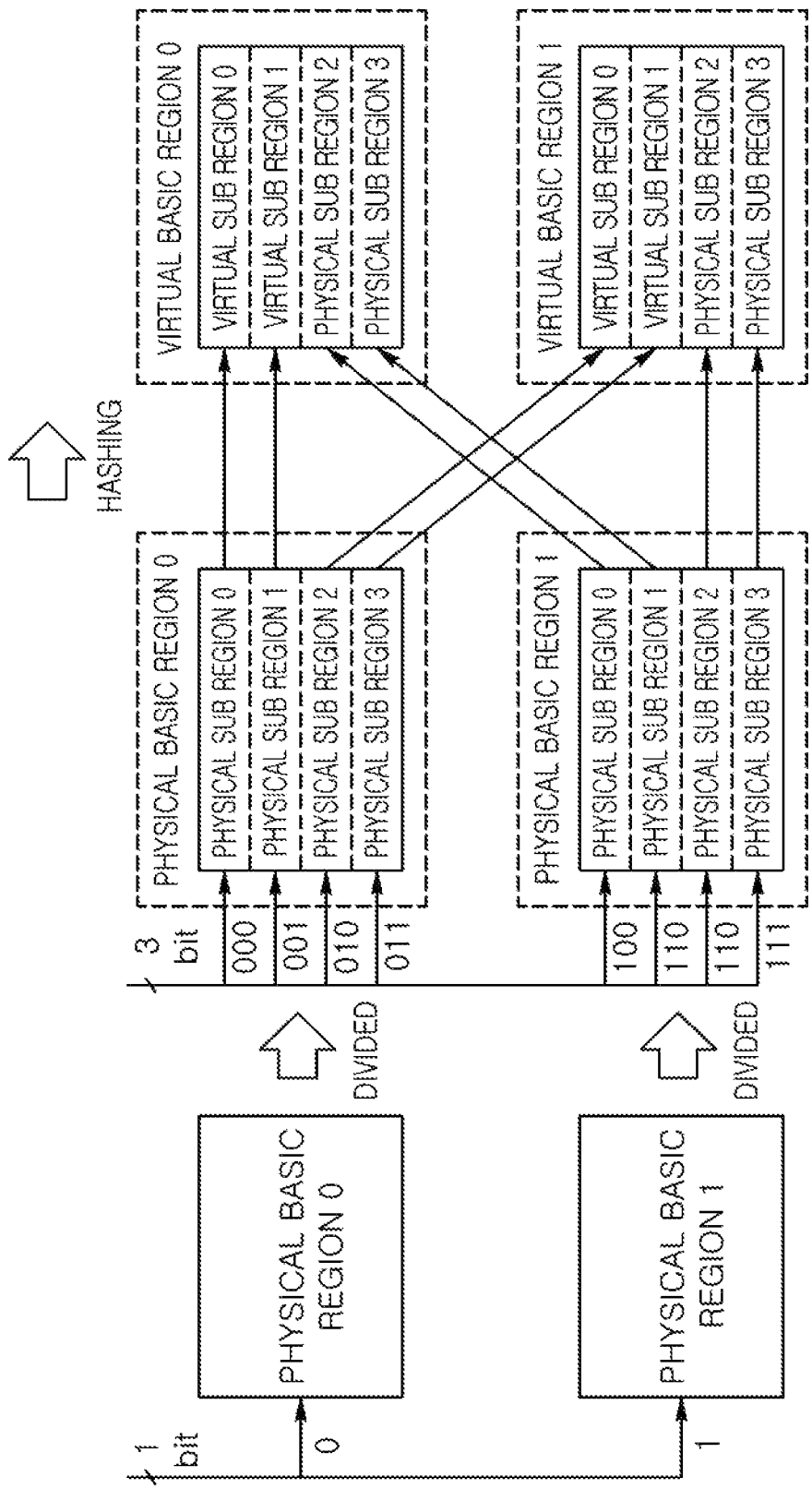
FIG. 2 is a view illustrating an example that divides each of physical basic regions which are units for hashing an information storage location into a plurality of physical sub regions having same size.

It should be noted that technical terminologies used in the present invention are used to describe a specific exemplary embodiment but are not intended to limit the present invention. Further, the technical terminologies which are used in the present invention should be interpreted to have meanings that are generally understood by those with ordinary skill in the art to which the present invention pertains, unless specifically defined to have different meanings in the present invention, but not be interpreted as an excessively comprehensive meaning or an excessively restricted meaning. Further, if a technical terminology used in the present invention is an incorrect technical terminology which does not precisely describe the spirit of the present invention, the technical terminology should be replaced with and understood as a technical terminology which may be correctly understood by those skilled in the art. Further, a general terminology used in the present invention should be interpreted as defined in a dictionary or in accordance with the context, but not be interpreted as an excessively restricted meaning.

A singular form used in the present invention may include a plural form unless it has a clearly opposite meaning in the context. Terminologies such as "be configured by" or "include" in the present invention should not be interpreted to necessarily include all of plural components or plural steps described in the present invention, but should be interpreted not to include some of the components or steps or to further include additional components or steps.

Further, terminologies including an ordinal number such as first or second which is used in the present invention may be used to explain components, but the components are not limited by the terminologies. The terminologies are used only for distinguishing one component from another component. For example, without departing from the scope of the present invention, the first component may be referred to as the second component, and similarly, the second component may also be referred to as the first component.

Hereinafter, exemplary embodiments according to the present disclosure will be described in detail with reference to the accompanying drawings, and the same or similar components are denoted by the same reference numerals regardless of reference numerals, and repeated description thereof will be omitted.

In describing the present disclosure, when it is determined that a detailed description of a related publicly known technology may obscure the gist of the present disclosure, the detailed description thereof will be omitted. Further, it is noted that the accompanying drawings are used just for easily appreciating the spirit of the present disclosure and it should not be interpreted that the spirit of the present disclosure is limited by the accompanying drawings.

FIG. 1 is a block diagram illustrating a configuration of an entire analyzing system 10 configured by an information storage table configured by a plurality of unit regions and an analyzing device which finds out optimal information storage.

As illustrated in FIG. 1, the analyzing system 10 includes a storage medium 100 and an analyzing device 200. However, all the components of the analyzing system 10 illustrated in FIG. 1 are not essential components, but the analyzing system 10 may be implemented by more components or less components than the components illustrated in FIG. 1.

The storage medium 110 may be any one of a dynamic random access memory (DRAM), a random access memory (RAM), a static random access memory (SRAM), a read-only memory (ROM), an electrically erasable programmable read-only memory (EEPROM), a programmable read-only memory (PROM), a phase change memory (PCM), and a magnetoresistance random access memory (MRAM).

Further, the storage medium 100 includes an information storage table 110.

The information storage table 110 includes information related with one or more of physical regions (or address information related with one or more of physical regions), information related with one or more of virtual regions (or address information related with one or more of virtual regions), and data (or information). Here, the information related with the one or more of physical regions includes position information of one or more of physical basic regions and position information of one or more of physical sub regions. Here, the information related with the one or more of virtual regions includes position information of one or more of virtual basic regions and position information of one or more of virtual sub regions. In this case, the data (or information) includes fault information, position information of a fault, routing information, and packet information. Further, the data (or information) may vary depending on a field (for example, including a memory field or a data communication field) to which the analyzing system 10 is applied and may be applied by being modified by a design of a designer. For example, in the case of a memory system which applies a memory repair using a redundant cell, the data (or information) may be a position (or position information) of a fault cell which is replaced by a spare cell which is provided in the memory system.

The analyzing device 200 performs an overall control function of the analyzing system 10.

Further, the analyzing device 200 finds out an optimal information storage location (or position information of K bits and position information of M+N−K bits which satisfy a predetermined target value) of the analyzing system 10 and allocates the position information of the K bits and the position information of M+N−K bits corresponding to the found optimal information storage location to the analyzing system 10.

Further, the analyzing device 200 maps information management unit regions (or unit regions), which hash the information storage location, to the physical basic regions in the information table 100. Here, the information storage table 110 is included in the storage medium 100 and configured by a plurality of unit regions.

In this case, when unit regions in which the information is to be stored and managed in the memory system such as a DRAM, a PCM, an MRAM, or a SRAM are banks, the analyzing device 200 combines all rows in one bank or a plurality of sub arrays, divides all the combined rows into 2M physical basic regions, and maps the unit regions to the divided 2M physical basic regions.

Further, when the number of unit regions to be managed in the storage medium 100 is not 2M, the analyzing device 200 may make a plurality of unit regions in the storage medium 100 to be 2M, and then map the 2M unit regions to the 2M physical basic regions. Here, M may be a natural number.

That is, in order to configure 2M unit regions according to the design of the designer, when the number of unit regions is not 2M, the analyzing device 200 performs a preprocessing process of mapping existing unit regions to 2M new unit regions according to the design of the designer and maps the 2M unit regions which are preprocessed to the 2M physical basic regions.

Further, the analyzing device 200 divides each of the plurality of physical basic regions in the storage medium 100 (or the information storage table 110) into a plurality of physical sub regions. Each of the plurality of physical sub regions has same size.

That is, Further, the analyzing device 200 divides each of the plurality of physical basic regions in the storage medium 100 (or the information storage table 110) into a plurality of physical sub regions having same size. Here, N may be a natural number. In this case, when one physical basic region is divided into 2N physical sub regions to be hashed, an additional bit may be required to index the physical sub regions.

Further, the analyzing device 200 combines (or configures) 2M+N physical sub regions indexed by M+N bits to generate 2K virtual basic regions. In this case, K is a natural number and may be equal to or smaller than M+N. Here, when bits for approaching the physical basic region are M bits and bits for approaching the physical sub region are N bits, a number of combinationable cases to generate the virtual basic region is M+NCM+N−K. Further, the size of K may be a bit rate to approach the information storage table 110.

Further, the analyzing device 200 divides (or resets) the generated 2K virtual basic regions into 2M+N−K virtual sub regions having same size.

That is, the analyzing device 200 combines the physical sub regions and sets a key value of the virtual basic regions in the unit of bit which is set in advance from the most significant bit to the least significant bit and sets a bit (or a remaining region) remaining after setting the key value of the virtual basic regions among the M+N bits as a key value of the virtual sub regions to configure the key of the entire virtual regions. The entire virtual regions include virtual basic regions and virtual sub regions. Here, the analyzing device 200 generates position information of the K bits for obtaining the key value of the virtual basic regions and position information of M+N−K bits for obtaining the key value of the virtual sub regions, in order to configure the key (or a key of the entire virtual region) of the virtual regions.

As described above, the analyzing device 200 may configure a hash function for obtaining (or setting) the key value of the virtual basic regions using the position information of the K bits among the M+N bits and for obtaining the key value of the virtual sub regions using position information of a bit remaining after setting the key value of the virtual basic regions among the M+N bits. Here, the hash function provides position information (for example, including position information of K bits and position information of M+N−K bits) related with the virtual regions based on physical regions addresses.

Further, the analyzing device 200 checks (or determines) whether a number (or a number of combined/recombined information) of information to be stored in the virtual basic regions (or a combination of the virtual basic regions) which is temporarily combined (or configured) satisfies a predetermined target value. Here, the target value is a value (or a value to satisfy the information to be stored) which is set in advance corresponding to information to be stored. In the case of a memory system which applies memory repair (or memory recovery) using a redundant cell, the target value may be a predetermined number (for example, a number of spare rows and a number of spare columns) which is same with the number of available (or available in the memory system) spare cells which are provided in the memory cell. That is, the target value may be same with the number of resources which may be available in all of the mapped physical basic regions with a predetermined value corresponding to the information to be stored. Further, in the case of a memory system which avoids a fault memory block, the target value may be same with the number of memory blocks which are available in all of the physical regions of the memory system.

As a checking result (or a determining result), when the number of information to be stored in the combined (or configured/generated) virtual basic regions (or a combination of the virtual basic regions) satisfies a predetermined target value, the analyzing device 200 stores the position information of K bits related with the virtual basic region which satisfies the target value among the M+N bits and the position information of M+N−K bits related with the virtual sub regions which satisfies the target value in a predetermined (or a pre-allocated) storage region in the storage medium 100. Here, a value of the position information of K bits and a value of the position information of M+N−K bits are configured as a vector and positions of the bits are configured by "0" (or K bits) corresponding to the key value (or a position of K bit) of the virtual basic region and "1" (or M+N−K bits) corresponding to the key value (or a position of M+N−K bits) of the virtual sub region.

That is, when the number of information to be stored in the combined (or configured/generated) virtual basic regions (or a combination of the virtual basic regions) satisfies a predetermined target value, the analyzing device 200 generates a position of K bits corresponding to the virtual basic region which satisfies the target value among the M+N bits and a position of M+N−K bits corresponding to the virtual sub region which satisfies the target value. Further, the analyzing device 200 stores the generated position (or position information of K bits) of K bits and the generated position (or position information of M+N−K bits) of M+N−K bits in as a vector in a predetermined storage region in the storage medium 100.

Further, the analyzing device 200 determines that the information storage table 110 may be successfully managed, based on the position information (or position information of K bits related with the virtual basic region which satisfies the target value) of K bits and the position information (or position information of M+N−K bits related with the virtual sub region which satisfies the target value) of M+N−K bits stored in the predetermined storage region in the storage medium 100 and stores data corresponding to the position information (or position information for the virtual region) of the virtual region in the information storage table 110. Here, the data (or information) includes fault information, position information of a fault, routing information, and packet information. Further, the data (or information) may vary depending on a field (for example, including a memory field or a data communication field) to which the analyzing system 10 is applied and may be applied by being modified by a design of a designer. For example, in the case of a memory system which applies memory repair using a redundant cell, the data (or information) may be a position (or position information) of a fault cell which is replaced by a spare cell which is provided in the memory system.

Further, as a checking result (or a determining result), when the number of information to be stored in the combined (or configured/generated) virtual basic regions (or a combination of the virtual basic regions) does not satisfy a predetermined target value, the analyzing device 200 repeatedly performs processes of recombining the plurality of physical sub regions according to a predetermined hashing method (or based on a predetermined hash function/with respect to a position of another K bits) excluding a previously combined case (or a plurality of cases combined according to the hashing method/a plurality of recombined cases) among the number of combinationable cases (for example, $M+NCM+N-K$) to check the recombined virtual basic regions and checking whether the number of information to be stored in the checked recombined virtual basic regions satisfies the predetermined target value.

As described above, the analyzing device 200 checks a first combination of physical sub regions which satisfy a target value to be designed by the virtual basic regions in all configurable combinations for the plurality of physical sub regions.

Further, when the target value is not satisfied for all combinations of positions of K bits among M+N bits, the analyzing device 200 determines that the data cannot be stored (or the information storage table 110 cannot be successfully managed) and ends the entire processes.

Figure 4:
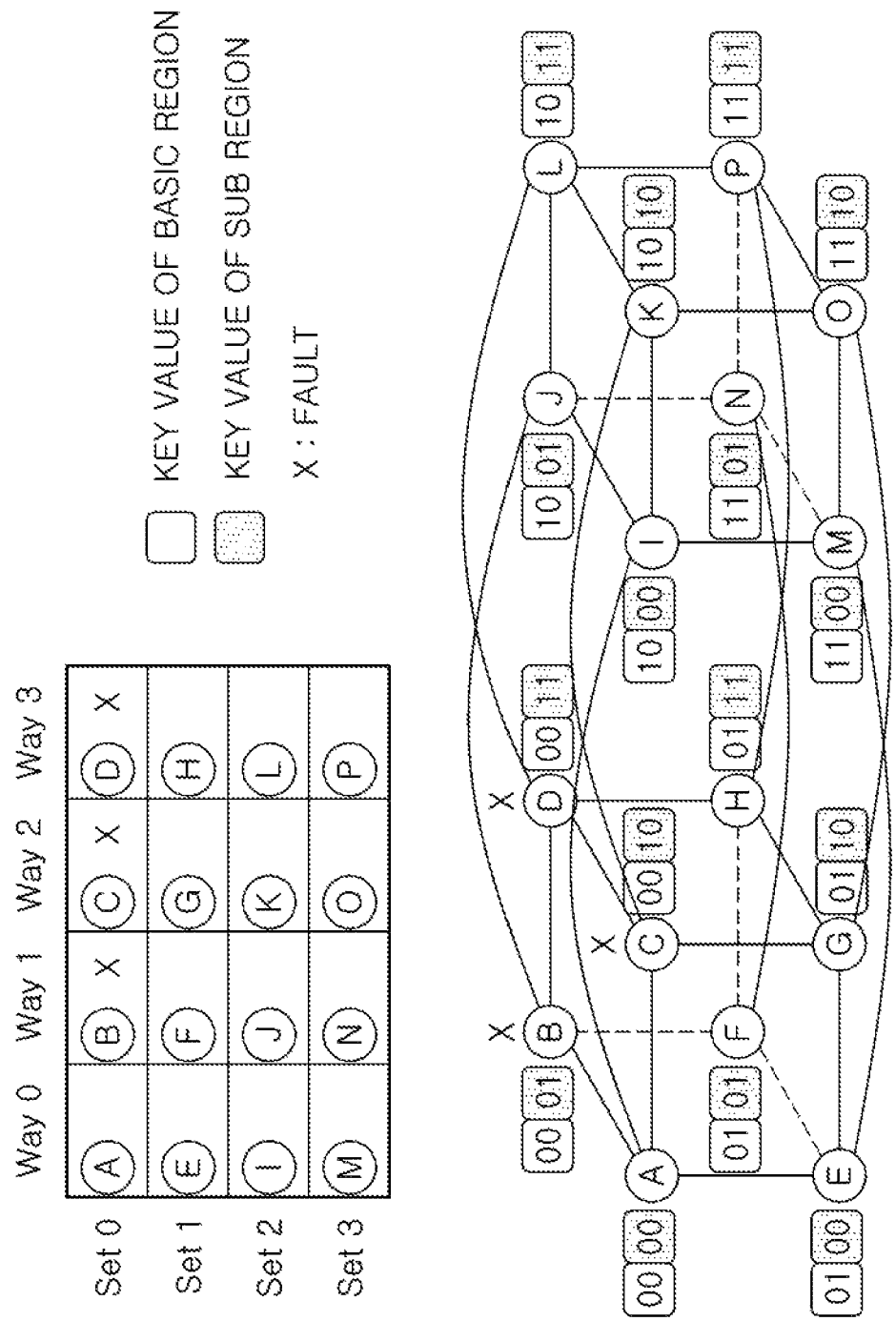
Figure 5:
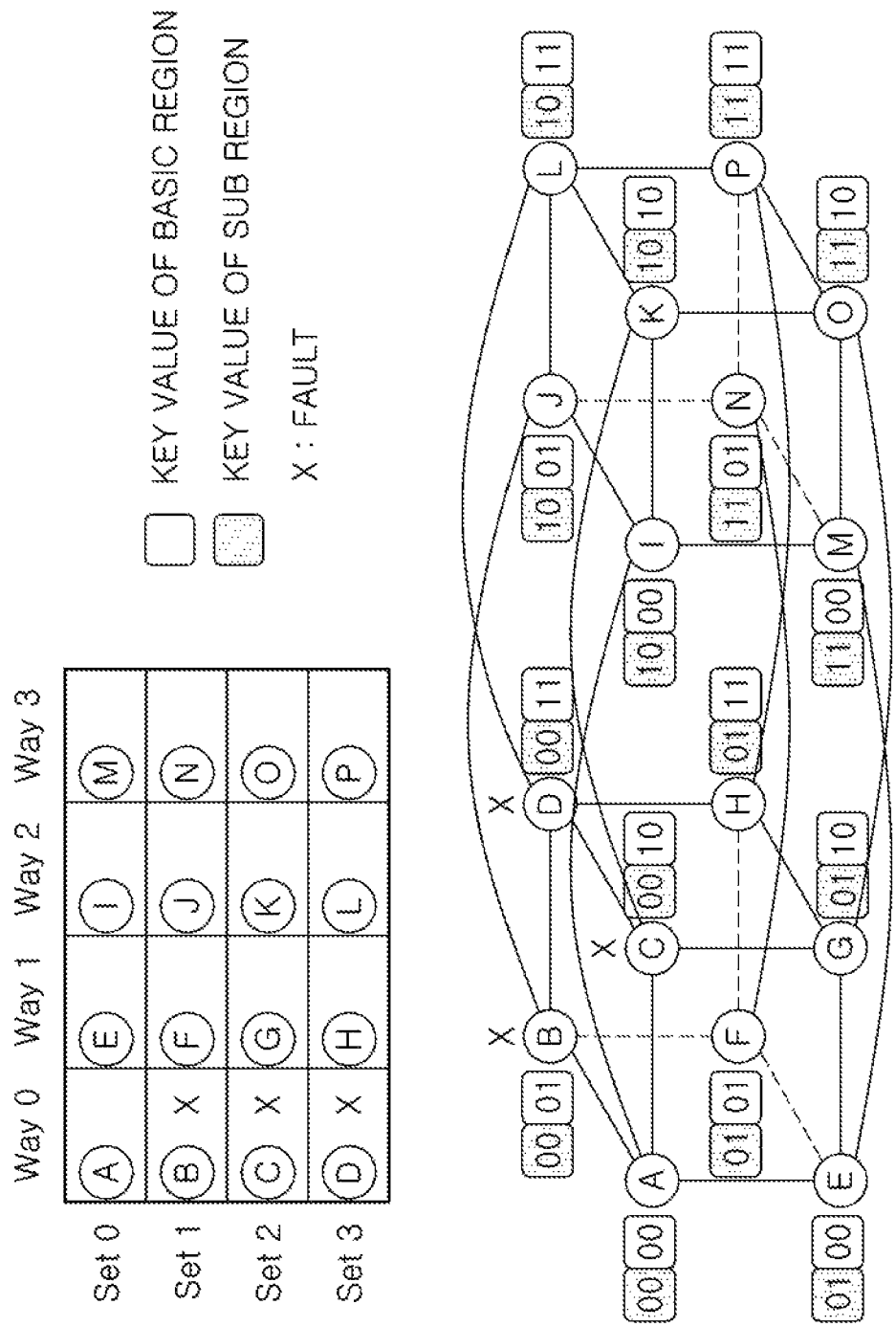

FIGS. 3 to 5 are views illustrating an example of configuring the most optimal cache memory when 4-way set-associative cache is implemented using 4×4 memory blocks including a fault block. Since three blocks among a total of 16 memory blocks have errors, when the 4-way set-associative cache is configured, a target value (or a designed target value) is to allocate one error to each set.

Further, since the cache is 4-way set-associative cache, K is 2.

Further, as illustrated in FIG. 3, when a 4-way cache memory is to be configured, the analyzing device 200 maps unit regions configured by row addresses to physical basic regions to configure four physical basic regions and configure each of the physical basic regions with four physical sub regions.

Therefore, the analyzing device 200 applies hashing with a total of four bits of higher two bits approaching a physical basic region and lower two bits approaching a physical sub region in the approached physical basic region to approach the physical sub region.

Further, as illustrated in FIG. 4, when the hashing is performed with the virtual basic regions (or the physical basic region), three fault blocks are allocated at the time of approaching set 0, so that a target value is not satisfied.

Further, as illustrated in FIG. 5, when among four bits which approaches the physical sub region to hash the virtual basic region, the lower two bits are used as an address (or the position information of K bit) to approach the virtual basic region and the upper two bits are used as an address (or the position information of M+N−K bits) to approach the virtual sub region in the virtual basic region, it is managed that one fault block is generated in each virtual basic region. Therefore, the target value may be satisfied. As a result, performance degradation of the entire system is minimized so that the cache memory may be configured to show optimal performance.

Figure 6:
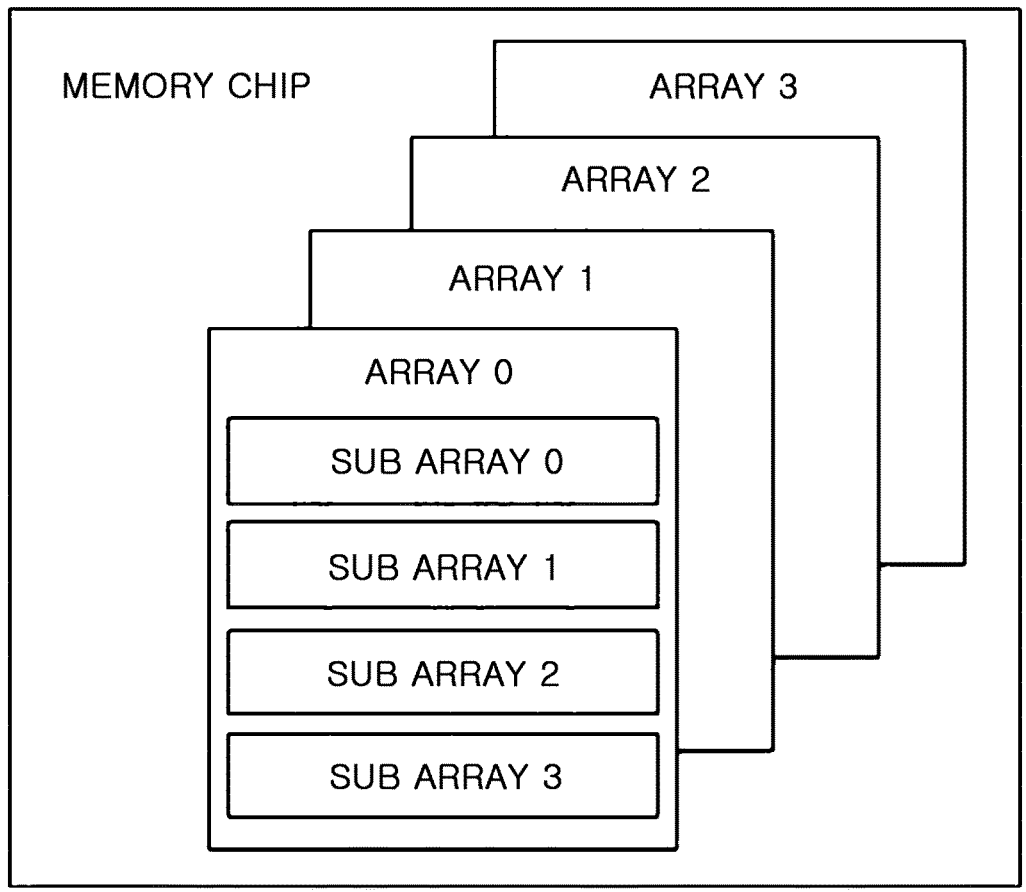
FIGS. 6, 7 and 8 are views illustrating an example which applies the present solution to a step of storing a fault address in a memory chip such as a DRAM.
Figure 7:
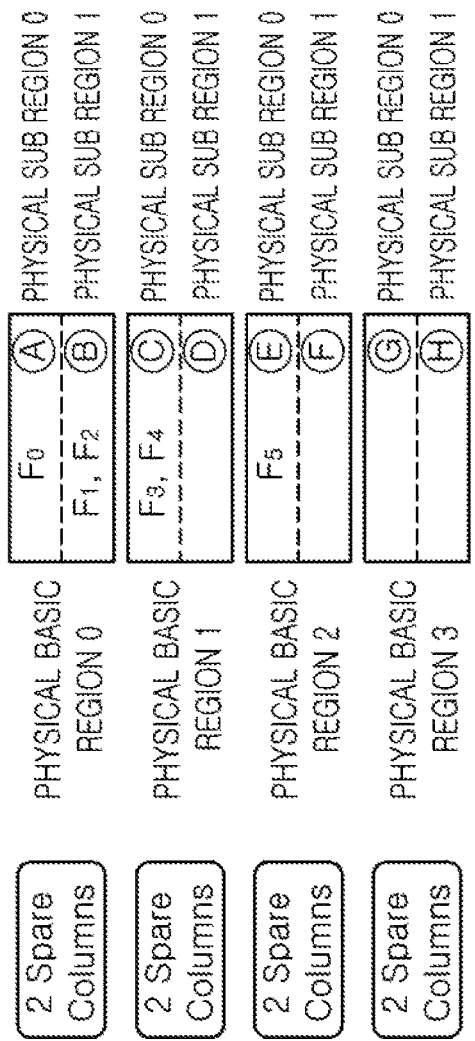
Figure 7:
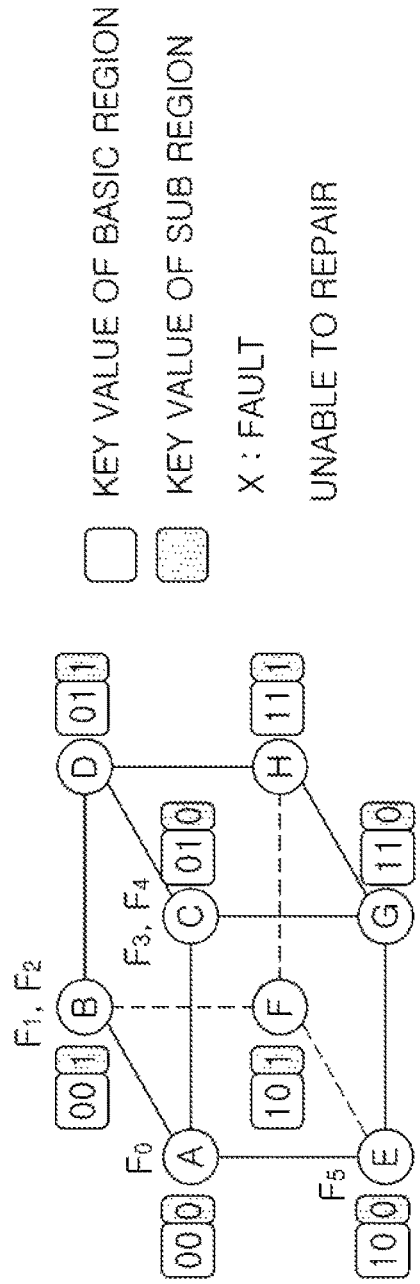
Figure 8:
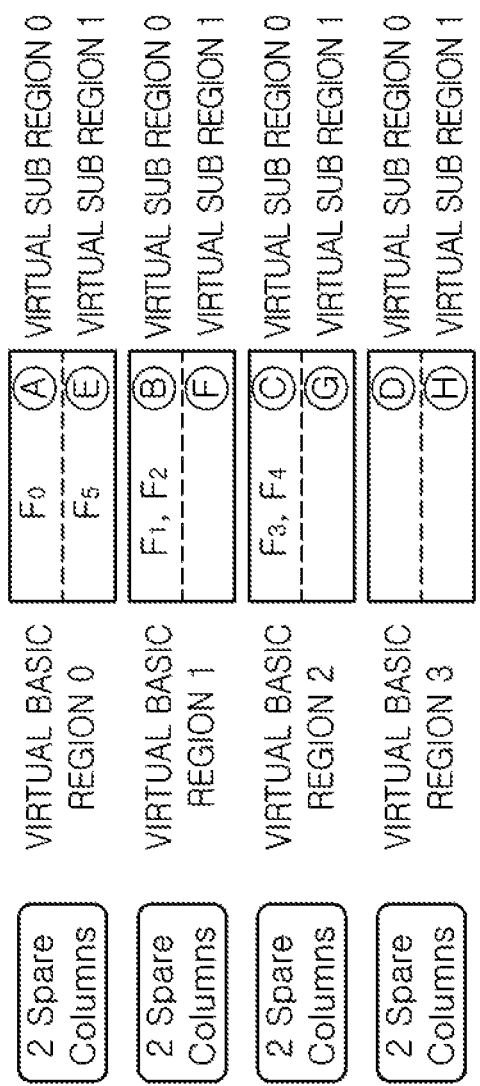
Figure 8:
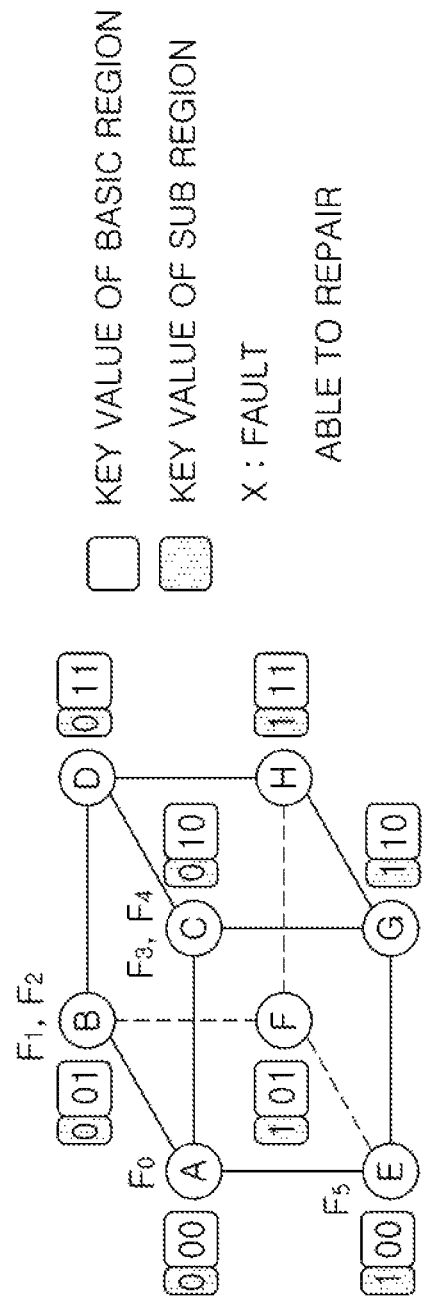

FIGS. 6 to 8 are views illustrating an example which applies the present solution to a step of storing a fault address in a memory chip such as a DRAM.

Further, as illustrated in FIG. 6, the DRAM memory chip is configured by a plurality of arrays.

Further, the array is configured by a plurality of sub arrays with a smaller size than that of the array.

When a fault is generated in the memory chip configured as described above, in order to perform repair while storing and managing an address where the fault is generated, the repair is performed on one sub array or on a plurality of sub arrays.

Therefore, in the related art, even though there is a sub array having a remaining space to store the fault address in the array, the remaining space cannot be used to store the fault address in other sub arrays. However, a storage space of the fault address of the sub array which remains in the array is utilized so that a storage space in the memory may be continuously used.

Further, when the DRAM memory chip illustrated in FIG. 6 is applied to the present solution, the sub array in the array serves as a unit region of the present solution and the unit region serves as a physical basic region. The physical sub region in the physical basic region is obtained by dividing the sub array by the number of physical sub regions.

Further, since the fault is managed and cured (or recovered) for every physical basic region, an entry number of the information storage table 110 for managing a fault address is equal to the number of physical basic area. As a result, K is 2.

Further, when the sub arrays in the array have different sizes, the sub arrays are added to be one and the added sub arrays are divided into 2M virtual sub arrays having same size and the divided virtual sub arrays are mapped to the physical sub arrays.

Further, when it is assumed that a number of faults which is repaired by one sub array is 2, 2 is a target value. Further, since a total of three faults are generated in addresses F0, F1, and F2 in a physical basic region 0 (or a sub array 0) illustrated in FIG. 7, the number of faults to be repaired for the sub array 0 is 3, which exceeds two faults which can be repaired by one sub array.

That is, as illustrated in FIG. 7, two faults are repaired for every physical basic region and a total number of physical basic regions is four so that eight fault addresses at the most may be managed. However, a state may incur in which the faults can not be repaired even when the total number of faults F0 to F5 is six.

As described above, FIG. 7 illustrates an example that divides each physical basic region into two physical sub regions to be combined as virtual basic regions.

That is, the analyzing device 200 divides each physical basic region into two physical sub regions to be combined as the virtual basic regions to hash a basic region using higher two bits (or position information of K bits) as a key value of the basic regions and indexes the lower one bit (or position information of M+N−K bits) with a key value of the sub regions. Therefore, when the virtual basic region is equal to the physical basic region, a storage space for a total of three fault address is required in the physical basic region (or a virtual basic region) 0. However, the provided storage space is limited to two for every basic region, which exceeds a limitation for managing a fault address.

Further, as illustrated in FIG. 8, the analyzing device 200 divides each physical basic region into two physical sub regions to be combined as the virtual basic regions to hash a basic region using lower two bits (or position information of K bits) as a key value of the basic region and indexes the highest one bit (or position information of M+N−K bits) with a key value of the sub region. Therefore, the fault addresses of all virtual basic regions do not exceed two, so that all fault addresses may be stored. In this case, since different physical basic regions are combined, a tag bit may be considered to distinguish a physical basic region corresponding to the address. However, the tag bit may not be used depending on the design of the designer.

Further, for example, information of the hash function may be generated as a vector to set a bit (or position information of K bit) which selects the virtual basic region sets to be 0 and to set a bit (or position information of M+N−K bit) which selects the virtual sub region to be 1.

Further, since a total number of generated virtual sub regions is eight, from log2(8)=3, lower two bits among bits which are used to index a total of three bits become virtual basic regions. Therefore, in FIG. 8, a value obtained by storing the bit (or position information of K bit) which selects the virtual basic region and the bit (or position information of M+N−K bit) which selects the virtual sub region as a vector is 100.

Figure 9:
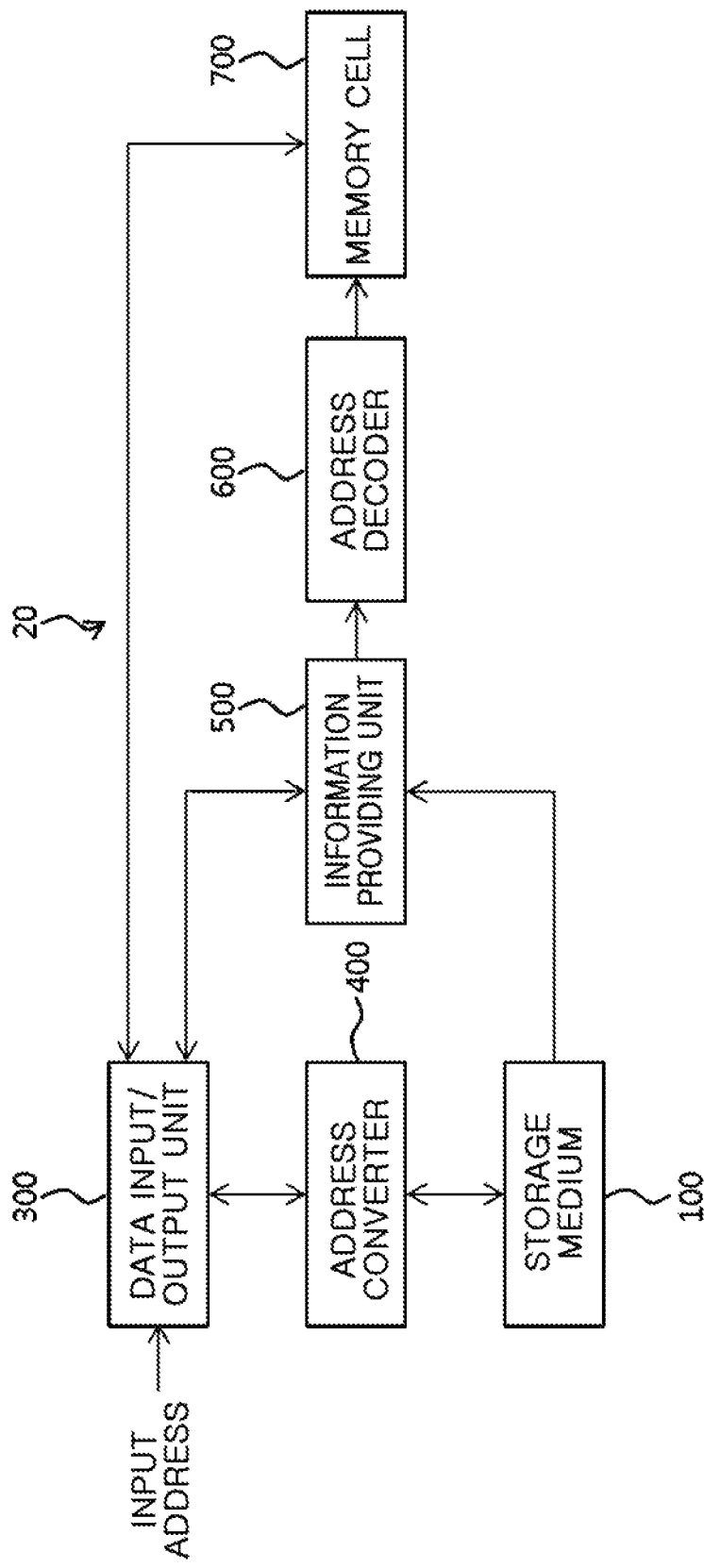
FIG. 9 is a block diagram illustrating a configuration of a memory apparatus applying fault repair based on a physical region and a virtual region.

FIG. 9 is a block diagram illustrating a configuration of a memory apparatus 20 which applies fault repair based on physical regions and virtual regions.

As illustrated in FIG. 9, the memory apparatus (or a memory device) 20 includes a storage medium 100, a data input/output unit 300, an address converter 400, an information providing unit 500, an address decoder 600, and a memory cell 700. However, all the components of the memory apparatus 20 illustrated in FIG. 9 are not essential components, but the memory apparatus 20 may be implemented by more components or less components than the components illustrated in FIG. 9.

As illustrated in FIG. 1, the storage medium 100 includes the information storage table 110.

Further, the storage medium 100 (or the information storage table 110) stores the position information (or position information of K bits related with the virtual basic region which satisfies the target value) of K bits and the position information (or position information of M+N−K bits related with the virtual sub region which satisfies the target value) of M+N−K bits in a predetermined storage region in the storage medium 100 in response to the control of the analyzing device 200.

Further, the storage medium 100 (or the information storage table 110) stores data corresponding to the position information of the virtual regions in the storage information table 110 (or a fault address storage space in the storage medium 100) based on the position information (or position information of K bits related with the virtual basic region which satisfies the target value) of K bits and the position information (or position information of M+N−K bits related with the virtual sub region which satisfies the target value) of M+N−K bits which are stored in the predetermined storage region in the storage medium, in response to the control of the analyzing device 200. Here, the data (or information) includes fault information, position information of a fault, routing information, and packet information. Further, the data (or information) may vary depending on a field (for example, including a memory field or a data communication field) to which the analyzing system 10 is applied and may be applied by being modified by a design of a designer. For example, in the case of a memory system which applies a memory repair using a redundant cell, the data (or information) may be a position (or position information) of a fault cell which is replaced by a spare cell which is provided in the memory system.

Further, the storage medium 100 stores a plurality of column addresses and a plurality of row addresses.

The data input/output unit 300 receives a memory request for approaching the memory apparatus 20 (or the memory cell 700) which is transmitted from an apparatus (or a device, not illustrated). Here, the apparatus (or device) may include a cache (not illustrated), a CPU (not illustrated), or an upper level memory (not illustrated) which requests data.

In this case, the memory request includes an input address (or address), a command (for example, including a read command or a write command), and write data.

When the read command is included in the memory request, the data input/output unit 300 temporarily stores data corresponding to an input address included in the memory request output from the memory cell 700.

Further, the data output unit 300 provides data corresponding to the input address which is included in the temporarily stored memory request to the apparatus (or device) which requests the data.

The address converter 400 calculates an input address included in the memory request received from the data input/output unit 300 and a position information value related with the virtual region stored in a predetermined (or previously allocated) storage region in the storage medium 100 (or the information storage table 110) to convert an address of a physical basic region into an address of a virtual basic region. In this case, the position information value related with the virtual region includes position information of K bits and position information of M+N−K bits by combining the physical region to the virtual region. Here, M, N, and K are natural numbers and K may be equal to or smaller than M+N.

The information providing unit 500 checks spare cell information (for example, including information on a spare column which replaces the fault address and information on a spare row which replaces the fault address) which replaces the fault address in a fault address storage space of the storage medium 100 based on the virtual basic region address which is converted by the address converter 400, a plurality of column addresses/row addresses which is set (registered/stored) in advance in the storage medium 100, and the input address.

Further, the information providing unit 500 selects an address (or a final address) based on the space cell information which replaces the checked fault address and the plurality of column addresses/row addresses which is set in advance in the storage medium 100.

That is, when the input address is any one of the plurality of column addresses and/or row addresses which is set in advance, the information providing unit 500 selects a value (or address/final address) which replaces the fault address with an address of the spare cell.

Further, when the input address is none of the plurality of column addresses and/or row addresses which is set in advance (or when the input address is different from the fault address), the information providing unit 500 selects the input address as a final address.

The information providing unit 500 provides the selected address to the address decoder 600. Here, the selected address (or the final address) may be any one of an address corresponding to a value obtained by replacing the fault address with the address of the spare cell and the input address.

As described above, the input address is replaced from the fault address to an address of the spare cell to approach an address of the space cell, rather than an address in which fault is caused. In this case, the fault repair using the spare row is replaced by a spare row which belongs to the physical address region for the purpose of efficiency and the fault repair using a spare column is replaced by a spare column which belongs to the virtual region area. Further, the positions of the spare row and the spare column are not limited. However, the physical address region performs fault repair using a spare column and the virtual address region may perform fault repair using the spare row in accordance with the design of the designer.

The address decoder 600 includes a row decoder and a column address.

That is, the address decoder 600 provides position information of data (or data to be read corresponding to the selected address) to the memory cell 700 based on the address (or the final address) provided from the information providing unit 500.

That is, when the address (or the final address) is a value (or address) obtained by replacing the fault address with the address of the spare cell, the address decoder 600 provides position information of data corresponding to the address of the spare cell to the memory cell 700.

Further, when the address (or the final address) is the above-mentioned input address, the address decoder 600 provides the position information of data corresponding to the input address to the memory cell 700.

The memory cell 700 performs any one of a read command function and a write command function included in the data request based on the position information of the data corresponding to the address (or the final address) provided from the decoder 600 and the data request received by means of the data input/output unit 300.

That is, when the read command is included in the data request, the memory cell 700 reads data to be output to the outside, related with the position information of data corresponding to the address (or the final address) from the position corresponding to the position information (or the position information of data corresponding to the final address) of the corresponding data in the memory cell 700.

Further, when the write command is included in the data request, the memory cell 700 stores write data in a specific position in the memory cell 600 based on the position information of data corresponding to the write data included in the memory request and the address (or the final address).

As described above, in the information storage table configured by a plurality of unit regions, the unit region which hashes the information storage location is mapped to a physical basic region and the mapped physical basic region is divided into a plurality of physical sub regions with the same size. In this state, a combination of virtual basic regions which satisfy a predetermined target value is checked in all configurable combinations, the position information related with the checked combination of the virtual basic region which satisfies the target value is stored, and information (or data) corresponding to the position information related with the combination of the virtual basic region which satisfies the stored target value is stored in the information storage table.

Further, as described above, the fault repair may be applied based on the physical region and the virtual region which use the information storage table of the virtual basic region using the hash function.

Hereinafter, a control method of a memory apparatus for applying fault repair based on the physical region and the virtual region will be described in detail with reference to FIGS. 1 to 10.

Figure 10:
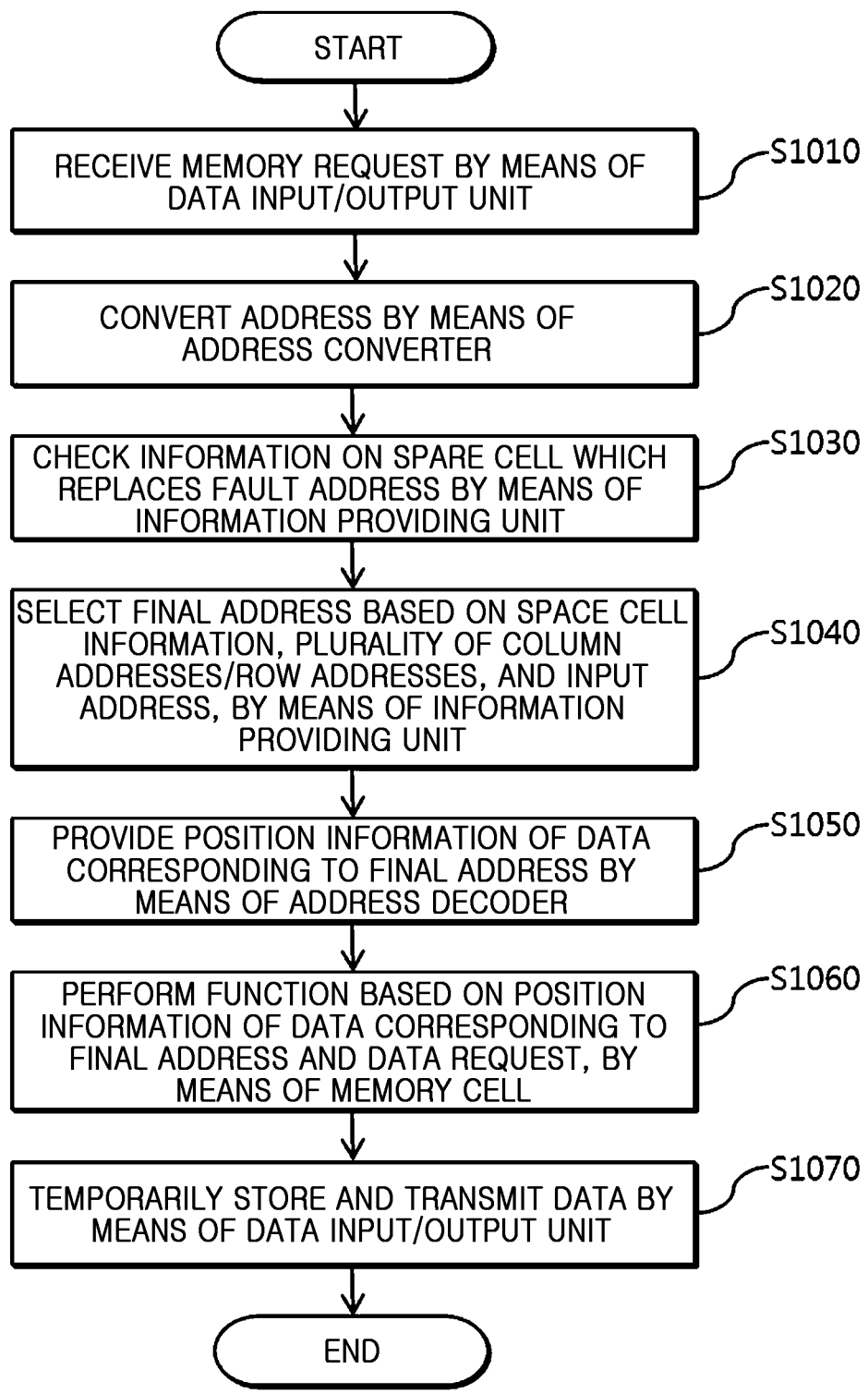
FIG. 10 is a flowchart illustrating a control method of a memory apparatus applying fault repair based on a physical region and a virtual region.

FIG. 10 is a flowchart illustrating a control method of a memory apparatus for applying fault repair based on a physical region and a virtual region.

First, the data input/output unit 300 receives a memory request for approaching the memory apparatus 20 (or the memory cell 700) which is transmitted from a device (not illustrated). Here, the apparatus (or device) may include a cache (not illustrated), a CPU (not illustrated), or an upper level memory (not illustrated) which requests data. In this case, the memory request includes an input address (or address), a command (for example, including a read command or a write command), and write data.

For example, the data input/output unit 300 receives a first memory request which is transmitted from a CPU to approach (for example, perform a data read command) the data in the memory cell 700. Here, the first memory request includes a first input address and a first read command.

As another example, the data input/output unit 300 receives a second memory request which is transmitted from an upper level memory to approach (for example, perform a data write command) the data in the memory cell 700. Here, the second memory request includes a second input address, a second write command, and second write data in step S1010.

Thereafter, the address converter 400 calculates an input address included in the memory request received from the data input/output unit 300 and a position information value related with the virtual region stored in a predetermined (or previously allocated) storage region in the storage medium 100 (or the information storage table 110) to convert an address of a physical basic region into an address of a virtual basic region. In this case, the position information value related with the virtual region includes position information of K bits and position information of M+N−K bits by combining the physical region to the virtual region. Here, M, N, and K are natural numbers and K may be equal to or smaller than M+N.

For example, the address converter 400 calculates the first input address with the position information value related with the virtual region stored in the storage region in the storage medium 100 to convert "010" which is a first physical basic region address corresponding to the first input address illustrated in FIG. 8 into "100" which is a first virtual basic region address.

As another example, the address converter 400 calculates the second input address with the position information value related with the virtual region stored in the storage region in the storage medium 100 to convert "100" which is a second physical basic region address corresponding to the second input address illustrated in FIG. 8 into "001" which is a second virtual basic region address in step S1020.

Thereafter, the information providing unit 500 checks spare cell information (for example, including information on a spare column which replaces the fault address and information on a spare row which replaces the fault address) which replaces the fault address in a fault address storage space of the storage medium 100 based on the virtual basic region address which is converted by means of the address converter 400, a plurality of column addresses/row addresses which is set (registered/stored) in advance in the storage medium 100, and the input address.

For example, the information providing unit 500 checks spare cell information (for example, including information on a first spare column and information on a second spare column) which replaces a fault address (for example, address information of F3 and F4) in the fault address storage space of the storage medium based on the converted first virtual basic region address (for example, "100"), the plurality of column addresses which is set in advance in the storage medium 100, and the first input address.

As another example, the information providing unit 500 checks spare cell information (for example, including information on an eleventh spare column) which replaces a fault address (for example, address information of F5 and F4) in the fault address storage space of the storage medium based on the converted second virtual basic region address (for example, "001"), the plurality of column addresses which is set in advance in the storage medium 100, and the second input address in step S1030.

Thereafter, the information providing unit 500 selects an address (or a final address) based on the space cell information which replaces the checked fault address and the plurality of column addresses/row addresses which is set in advance in the storage medium 100 and the input address.

That is, when the input address is any one of the plurality of column addresses and/or row addresses which is set in advance, the information providing unit 500 selects a value (or address/final address) which replaces the fault address with an address of the spare cell.

Further, when the input address is none of the plurality of column addresses and/or row addresses which is set in advance (or when the input address is different from the fault address), the information providing unit 500 selects the input address as a final address.

The information providing unit 500 provides the selected address to the address decoder 600. Here, the selected address (or the final address) may be any one of an address corresponding to a value obtained by replacing the fault address with the address of the spare cell and the input address.

For example, when the first input address is F3, the information providing unit 500 selects an address of a first spare column which replaces F3 and provides the address of the selected spare column to the address decoder 600 based on spare cell information (for example, including information on the first spare column and information on the second spare column) which replaces the fault address (for example, address information on F3 and F4) of FIG. 8, a plurality of column addresses (for example, a fault address, for example, address information on F3 and F4) which is stored in advance in the storage medium 100, and the first input address.

As another example, when the second input address is F5, the information providing unit 500 selects an address of an eleventh spare column which replaces F5 and provides the address of the selected eleventh spare column to the address decoder 600 based on spare cell information (for example, including information on the eleventh spare column) which replaces the fault address (for example, address information on F5) of FIG. 8, a plurality of column addresses (for example, a fault address, for example, address information on F5) which is stored in advance in the storage medium 100, and the second input address in step S1040.

Thereafter, the address decoder 600 provides position information of data (or data to be read corresponding to the selected address) to the memory cell 700 based on the address (or the final address) provided from the information providing unit 500.

That is, when the address (or the final address) is a value (or address) obtained by replacing the fault address with the address of the spare cell, the address decoder 600 provides position information of data corresponding to the address of the spare cell to the memory cell 700.

Further, when the address (or the final address) is the above-mentioned input address, the address decoder 600 provides the position information of data corresponding to the input address to the memory cell 700.

For example, the address decoder 600 provides position information of the first data corresponding to the address of the first spare column to the memory cell 700.

As another example, the address decoder 600 provides position information of the eleventh data corresponding to the address of the eleventh spare column to the memory cell 700 in step S1050.

Thereafter, the memory cell 700 performs any one of a read command function and a write command function included in the data request based on the position information of the data corresponding to the address (or the final address) provided from the decoder 600 and the data request received by means of the data input/output unit 300.

That is, when the read command is included in the data request, the memory cell 700 reads data to be output to the outside, related with the position information of data corresponding to the address (or the final address) from the position corresponding to the position information (or the position information of data corresponding to the final address) of the corresponding data in the memory cell 700.

Further, when the write command is included in the data request, the memory cell 700 stores write data in a specific position in the memory cell 600 based on the position information of data corresponding to the write data included in the memory request and the address (or the final address).

For example, when the first read command is included in the first memory request, the memory cell 700 reads first data corresponding to the position information of the first data from a specific position in the memory cell 700 based on the position information of the first data.

As another example, when the second write command is included in the second memory request, the memory cell 700 stores the second write data in a specific position in the memory cell 700, based on second write data included in the second memory request and the position information of the eleventh data in step S1060.

Thereafter, when the read command is included in the memory request, the data input/output unit 300 temporarily stores data corresponding to an input address included in the memory request output from the memory cell 700.

Further, the data output unit 300 provides data corresponding to the input address which is included in the temporarily stored memory request to the apparatus (or device) which requests the data.

For example, when the first read command is included in the memory request, the data input/output unit 300 provides the first data (or first data corresponding to the first input address included in the first memory request) which is read from the memory cell 700 to the CPU which request the first data in step S1070.

In some scenarios, as described above, the system which maps a unit region which hashes an information storage location in an information storage table configured by a plurality of unit regions to a physical basic region, checks a combination of a virtual basic region which satisfies a predetermined target value among all configurable combinations while dividing the mapped physical basic region into a plurality of physical sub regions with the same size, stores position information related with the combination of the virtual basic region which satisfies the checked target value, and stores information (or data) corresponding to position information related with the combination of the virtual basic regions which satisfy the stored target value in the information storage table, thereby improving a performance of the entire system by uniformly using the entire information storage space in every region and maximizing efficiency of the information storage space by utilizing the information storage space.

Further, according to the present solution, as described above, the fault repair is applied based on the physical region and the virtual region which use an information storage table of a virtual basic region using a hash function, thereby improving efficiency of the fault repair.

Changes or modifications of the above description may be made by those skilled in the art without departing from the spirit and scope of the present invention. Therefore, the exemplary embodiments of the present invention are provided for illustrative purposes only but not intended to limit the technical spirit of the present invention. The scope of the technical concept of the present invention is not limited thereto. The protective scope of the present invention should be construed based on the following claims, and all the technical concepts in the equivalent scope thereof should be construed as falling within the scope of the present invention.

According to the present invention, the fault repair is applied based on the physical region and the virtual region which use an information storage table of a virtual basic region using a hash function, thereby improving efficiency of the fault repair, to be widely used in an information storage device such as a memory field.

What is claimed is:

1. A control method of a memory apparatus applying fault repair based on a physical region and a virtual region, the control method comprising:
   receiving a memory request transmitted from a device, by means of a data input/output unit;
   converting a physical basic region address into a virtual basic region address based on input address included in the memory request and a position information of the virtual region stored in a predetermined storage region set in a storage medium, by means of an address converter;
   checking spare cell information which replaces a fault address in a fault address storage space of the storage medium based on the converted virtual basic region address, a plurality of column addresses or row addresses set in advance in the storage medium, and the input address, by means of an information providing unit;
   selecting a final address based on the checked spare cell information which replaces the fault address, the plurality of column addresses or row addresses set in advance in the storage medium, and the input address, by means of the information providing unit;
   providing position information of data corresponding to the selected final address, by means of an address decoder; and
   performing any one of a read command function and a write command function included in the data request, based on the position information of the data corresponding to the final address and the data request, by means of a memory cell.

2. The control method according to claim 1, wherein the memory request includes at least one of an input address, a command, and write data.

3. The control method according to claim 1, wherein the position information of the virtual region includes position information of K bits and position information of M+N−K bits related with the virtual region, the virtual region being configured by combining the physical region, M, N and K being natural numbers and K being equal to or smaller than M+N.

4. The control method according to claim 1, wherein the spare cell information which replaces the fault address is any one of information on a spare column which replaces the fault address and information on a spare row which replaces the fault address.

5. The control method according to claim 1, wherein in the checking of space cell information which replaces the fault address, the input address is replaced to an address of the spare cell from the fault address to approach the address of the spare cell which is not an address in which the fault is generated to repair a fault.

6. The control method according to claim 1, wherein in the checking of space cell information which replaces the fault address, in a case of fault repair using a spare row, the fault address is replaced by an address of a spare row which belongs to a physical address region, and in a case of fault repair using a spare column, the fault address is replaced by an address of a spare column which belongs to a virtual address region.

7. The control method according to claim 1, wherein the selecting of a final address includes any one of:
   selecting, when the input address is any one of the plurality of predetermined column addresses and row addresses, a value obtained by replacing the fault address by an address of a spare cell as the final address, by means of the information providing unit; and
   selecting, when the input address is not the fault address, the input address as the final address, by means of the information providing unit.

8. The control method according to claim 1, wherein the providing of position information of data corresponding to the final address includes any one of:
   providing, when the final address is a value obtained by replacing the fault address by an address of a spare cell, position information of data corresponding to an address of the spare cell; and
   providing, when the final address is the input address, position information of data corresponding to the input address.

9. The control method according to claim 1, wherein in the performing of any one of a read command function and a write command function included in the data request, when the read command is included in the data request, data to be output to the outside related with the position information of data corresponding to the final address is read from a position corresponding to position information of the data in the memory cell.

10. The control method according to claim 1, wherein in the performing of any one of a read command function and a write command function included in the data request, when the write command is included in the data request, the write data is stored in the memory cell based on position information of write data included in the memory request and data corresponding to the final address.

11. The control method according to claim 1, further comprising:
   temporarily storing, when a read command is included in the memory request, data corresponding to the input address output from the memory cell, by means of the data input/output unit; and
   providing data corresponding to the temporarily stored input address to the device which requests the data, by means of the data input/output unit.

12. A memory apparatus applying fault repair based on a physical region and a virtual region, the memory apparatus comprising:
   a data input/output unit which receives a memory request transmitted from a device;

an address converter which converts a physical basic region address into a virtual basic region address based on input address included in the memory request and a position information of the virtual region stored in a predetermined storage region set in a storage medium;

an information providing unit which checks spare cell information which replaces a fault address in a fault address storage space of the storage medium based on the converted virtual basic region address, a plurality of column addresses or row addresses set in advance in the storage medium, and the input address and selects a final address based on the checked spare cell information which replaces the fault address, the plurality of column addresses or row addresses set in advance in the storage medium, and the input address;

an address decoder which provides position information of data corresponding to the selected final address; and a memory cell which performs any one of a read command function and a write command function included in the data request, based on the position information of the data corresponding to the final address and the data request.

13. The memory apparatus according to claim 12, wherein the memory request includes at least one of an input address, a command, and write data.

14. The memory apparatus according to claim 12, wherein the position information of the virtual region includes position information of K bits and position information of M+N−K bits related with the virtual region, the virtual region being configured by combining the physical region, M, N and K being natural numbers and K being equal to or smaller than M+N.

15. The memory apparatus according to claim 12, wherein the spare cell information which replaces the fault address is any one of information on a spare column which replaces the fault address and information on a spare row which replaces the fault address.

16. The memory apparatus according to claim 12, wherein, when the input address is any one of the plurality of predetermined column addresses and row addresses, the information providing unit selects a value obtained by replacing the fault address by an address of a spare cell as the final address.

17. The memory apparatus according to claim 12, wherein, when the input address is not equal to the fault address, the information providing unit selects the input address as the final address.

18. The memory apparatus according to claim 12, wherein, when the final address is a value obtained by replacing the fault address by an address of the spare cell, the address decoder provides position information of data corresponding to the address of the spare cell to the memory cell.

19. The memory apparatus according to claim 12, wherein, when the final address is the input address, the address decoder provides position information of data corresponding to the input address to the memory cell.

20. The memory apparatus according to claim 12, wherein, when the read command is included in the data request, the memory cell reads data to be output to the outside related with the position information of data corresponding to the final address from a position corresponding to position information of the data in the memory cell.

21. The memory apparatus according to claim 12, wherein, when the write command is included in the data request, the memory cell stores the write data in the memory cell based on position information of write data included in the memory request and data corresponding to the final address.

22. The memory apparatus according to claim 12, wherein, when a read command is included in the memory request, the data input/output unit temporarily stores data corresponding to the input address output from the memory cell; and provides data corresponding to the temporarily stored input address to the device which requests the data.

* * * * *